May 29, 1923.
H. MITCHELL
1,457,183
NECK OR NOZZLE CONNECTION FOR PIPE LINES
Filed Jan. 26, 1921    2 Sheets-Sheet 1
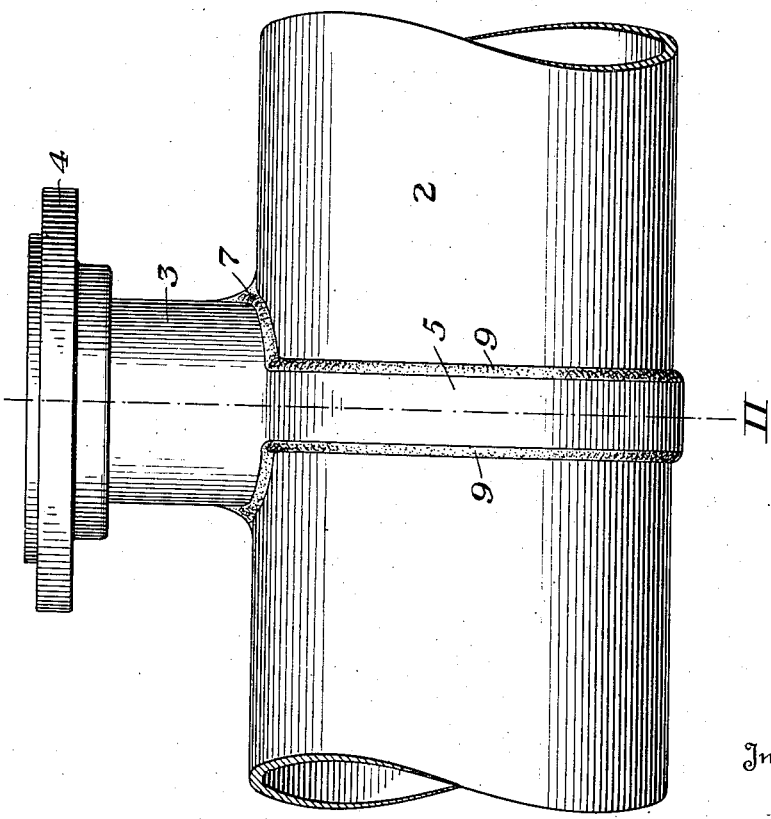

May 29, 1923. 1,457,183
H. MITCHELL
NECK OR NOZZLE CONNECTION FOR PIPE LINES
Filed Jan. 26, 1921 2 Sheets-Sheet 2
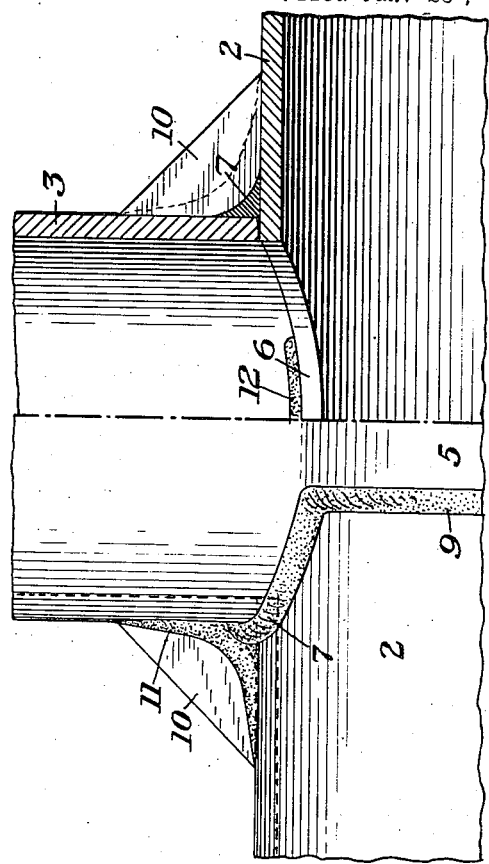
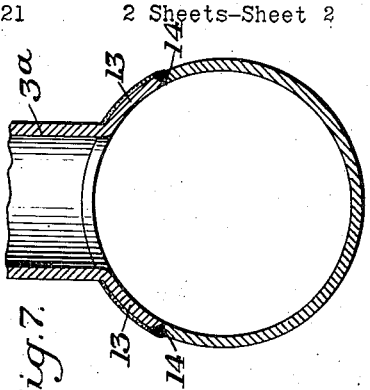
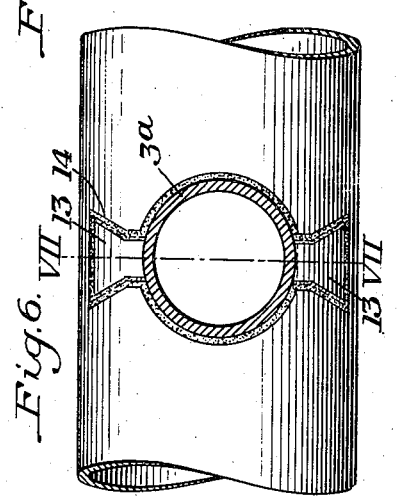
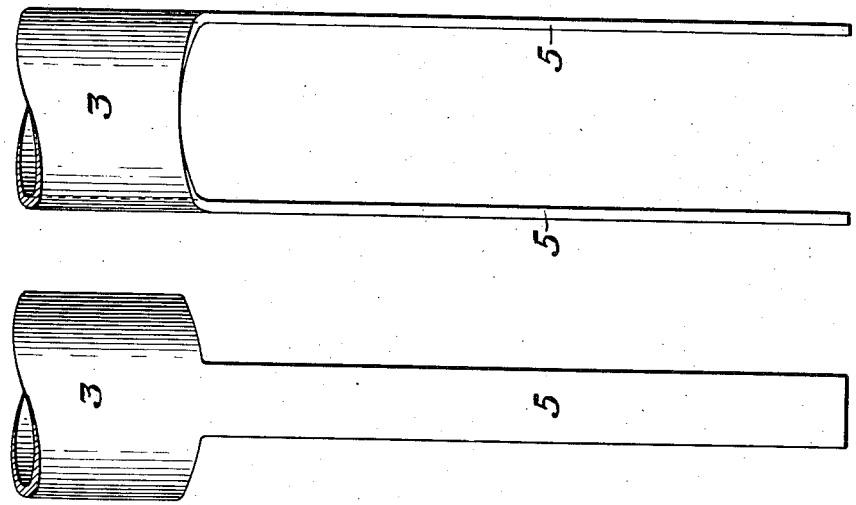
INVENTOR.

Patented May 29, 1923.

1,457,183

UNITED STATES PATENT OFFICE.

HARBOUR MITCHELL, OF PITTSBURGH, PENNSYLVANIA, ASSIGNOR TO AMERICAN FOUNDRY & CONSTRUCTION COMPANY, OF PITTSBURGH, PENNSYLVANIA, A CORPORATION OF PENNSYLVANIA.

NECK OR NOZZLE CONNECTION FOR PIPE LINES.

Application filed January 26, 1921. Serial No. 440,209.

*To all whom it may concern:*

Be it known that I, HARBOUR MITCHELL, a citizen of the United States, residing at Pittsburgh, county of Allegheny, and State of Pennsylvania, have invented a new and useful Improvement in Neck or Nozzle Connections for Pipe Lines, of which the following is a full, clear, and exact description, reference being had to the accompanying drawings, forming part of this specification, in which—

Figure 1 is a side elevation of a structure embodying my invention;

Figure 2 is a section on the line II—II of Figure 1;

Figures 3 and 4 are elevations, partly broken away, the two views being taken in planes at right angles to each other and showing one form of the neck or nozzle blank;

Figure 5 is a view partly in side elevation and partly in vertical section showing another form of the completed device;

Figure 6 is a sectional plan view illustrating still another form of the invention; and Figure 7 is a section on the line VII—VII of Figure 6.

My invention has relation to branch connections for pipe lines, such as steam lines, gas lines, water lines, oil lines, air lines, etc., these connections being usually known in the art as necks or nozzles; and more particularly to structures of this character in which the neck or nozzle is separately formed and is attached to the pipe line proper by a welding operation.

Heretofore necks or nozzles have been formed separately and welded to pipe lines by simply seating them over the opening in the pipe line, and forming a direct weld between the neck and nozzle and the pipe. The strength and efficiency of such connection depends largely upon the skill of the operator and the thoroughness with which the weld is made. The object of the present invention is to provide a connection of this character and a method of making the same, in which, in addition to the weld, the neck or nozzle has a mechanical connection with the pipe of sufficient strength to itself withstand the internal working pressures with an ample factor of safety, without depending upon the weld itself.

Referring first to that form of my invention shown in Figures 1 to 4 inclusive, the numeral 2 designates a pipe line, and 3 a neck or nozzle secured thereto in accordance with my invention. This neck or nozzle is provided with any usual or suitable bolting or attaching flange 4, which forms no part of the present invention.

In the form shown in these figures I provide the neck or nozzle 3 with two depending strap portions 5, which are of sufficient length, when the neck or nozzle is seated over the opening 6 in the pipe, to extend around the pipe exteriorly thereof, as shown in Figures 1 and 2.

In making the connection the neck or nozzle is seated over the opening 6 and is welded thereto, preferably by flowing the welding metal, as indicated at 7, into and over the joint between the neck or nozzle and the pipe. The straps 5 are bent around the pipe with their ends meeting and preferably overlapped, as shown in 8 at Figure 2. These straps are also welded to the pipe. This may be done in any suitable manner, but is preferably effected by means of a welding metal 9 flowed along both edges of the straps.

These straps form reinforcing bands which are of sufficient strength to withstand the internal working pressure of the full area of the nozzle with an ample factor of safety. The weld of the nozzle proper to the pipe prevents leakage and also gives an additional factor of safety against breaking. The entire structure is preferably thoroughly annealed after a welding has been completed. Both the nozzle and the main pipe may be of standard, or extra heavy, pipe, and the bolting flange 4 can be attached by any standard or suitable method.

Where extreme conditions of service are to be encountered, the joint between the nozzle and the pipe can be reinforced by any desired number of ribs 10 set in the angle between the nozzle and the main pipe and welded thereto as indicated at 11.

I may also form an internal weld between the legs or straps and the main pipe, as indicated at 12, in Figures 2 and 5.

In Figures 6 and 7 I have shown another form of my invention in which the neck or nozzle 3ª instead of having long strap members which are bent around the main pipe, is formed with opposite dove-tailed tongues or projections 13, which are adapted to fit within correspondingly shaped grooves or slots 14 in the main pipe. These tongues or projections are bent downwardly into engagement with the grooves or slots, after the nozzle is seated on the pipe, and welding metal is flowed in between their edges and the walls of the slots or grooves, such edges and walls being preferably beveled to form V-shaped seats for the welding metal.

It will be understood that any desired number of these tongues or projections may be employed and that they may be of various shapes arranged to have a mechanical inner lap with the pipe.

I claim:

1. The method of attaching a nozzle or a neck member to a metal pipe, which consists in forming a circular opening in the pipe, providing a nozzle having an internal diameter substantially equal to the diameter of said opening and having integral projections extending beyond its seating edge, seating the nozzle on the pipe around said opening, bending said projections into close engagement throughout their length with the pipe, and welding the edges of the nozzel to the edge walls of said opening and also welding said projections to the body of the pipe, substantially as described.

2. The method of attaching a neck or nozzle member to a metal pipe, which consists in forming an opening in the pipe, providing a neck or nozzle having projections extending beyond its seating edge, seating the nozzle on the pipe, engaging the projections with the body of the pipe, welding the nozzle and the projections to the pipe, and also welding reinforcing members in the exterior angle between the neck or nozzle and the pipe, substantially as described.

3. The method of attaching a nozzle or neck member to a metal pipe, which consists in forming a circular opening in the pipe, providing a nozzle having an internal diameter substantially equal to the diameter of said opening and having integral strap members, seating the nozzle on the pipe around said opening, bending the integral strap members around the pipe, and welding both the nozzle and the strap members to the pipe, substantially as described.

4. The method of attaching a nozzle or neck member to a metal pipe, which consists in forming an opening in the pipe, providing a nozzle having strap members, seating the nozzle on the pipe over said opening, bending the strap members around the pipe, and welding both the nozzle and the strap members to the pipe, and also welding bracing members in position in the exterior angle between the nozzle and the pipe, substantially as described.

5. A neck or nozzle connection for pipe lines, comprising a nozzle member seated around an opening in the pipe, and having integral projections which are engaged with the pipe circumferentially thereof, said nozzle member and projections being welded to the pipe, substantially as described.

6. A nozzle connection for pipe lines, comprising a nozzle member seated around the opening in the pipe and welded thereto, said member also having integral strap portions which extend entirely around the pipe and are secured thereto, substantially as described.

7. A nozzle connection for pipe lines, comprising a nozzle member seated around the opening in the pipe and welded thereto, said member also having strap portions which extend around the pipe and are secured thereto, together with braces secured in the angle between the nozzle member and the pipe, substantially as described.

8. In the method of attaching a nozzle or a neck member to a metal pipe, the steps consisting in forming an opening in the pipe, providing a nozzle having projections extending beyond its seating edge and of a sufficient cross sectional area to provide a tensile strength greater than the internal working pressure of the full area of the nozzle or neck, seating the nozzle on the pipe over said opening, engaging said projections with the pipe, and welding the edges of the nozzles to the edge walls of said opening and also welding said projections to the body of the pipe, substantially as described.

9. In the method of attaching a nozzle or a neck member to a metal pipe, the steps consisting in forming an opening in the pipe, providing a nozzle having projections extending beyond its seating edge and of a sufficient cross sectional area to provide a tensile strength greater than the internal working pressure of the full area of the nozzle or neck, seating the nozzle on the pipe over said opening, engaging said projections with the pipe, welding the edges of the nozzle to the edge walls of said opening and also welding said projections to the body of the pipe, and welding reinforcing members to the exterior angle betwen the nozzle or neck and the pipe, substantially as described.

10. The method of attaching a nozzle or neck member to a metal pipe, comprising forming an opening in the pipe, providing a nozzle having integral strap members of a sufficient length to extend entirely around the pipe, seating the nozzle or neck on the pipe over said opening, bending the strap members around the pipe, and welding both the nozzle and the strap members to the pipe, substantially as described.

11. The method of attaching a nozzle or neck member to a metal pipe, comprising forming an opening in the pipe, providing a nozzle having integral strap members of a sufficient length to extend entirely around the pipe, seating the nozzle or neck on the pipe over said opening, bending the strap members around the pipe, welding both the nozzle and the strap members to the pipe, and welding bracing members in position in the exterior angle between the nozzle and the pipe, substantially as described.

12. In the method of attaching a nozzle or neck member to a metal pipe, the steps consisting in forming an opening in the pipe, providing a nozzle or neck having integral strap members, seating the nozzle or neck on the pipe over said opening, bending the strap members around the pipe and then welding both the nozzle and the strap members to the pipe whereby a portion of the welded joint between the strap members and the pipe is in shear circumferentially of the pipe.

13. A nozzle connection for pipe lines, comprising a nozzle member seated around an opening in the pipe, and having diametrically opposite integral strap projections extending for a substantial distance circumferentially of the pipe, substantially as described.

14. A nozzle connection for pipe lines, comprising a nozzle member seated around an opening in the pipe, and having integral strap projections extending around the sides of the pipe with their opposed ends in adjacent relationship, substantially as described.

15. A nozzle connection for pipe lines, comprising a nozzle member seated around an opening in the pipe, and diametrically opposite integral projections on said nozzle member engaged with the pipe and having their side edges welded thereto whereby a portion at least of the weld is in shear, substantially as described.

16. In a nozzle connection for pipe lines, a nozzle member seated around an opening in the pipe, and integral strap members projecting from said member and welded to the pipe, said strap members having a cross sectional area providing sufficient strength to withstand the internal working pressure of the full area of the nozzle irrespective of the welded connection between the nozzle member and pipe, substantially as described.

In testimony whereof, I have hereunto set my hand.

HARBOUR MITCHELL.